United States Patent [19]

Zysman et al.

[11] Patent Number: 5,638,675
[45] Date of Patent: Jun. 17, 1997

[54] DOUBLE LOBED MIXER WITH MAJOR AND MINOR LOBES

[75] Inventors: Steven H. Zysman, Middletown; Wesley K. Lord, Glastonbury; Thomas J. Barber, West Hartford, all of Conn.

[73] Assignee: United Technologies Corporation, Hartford, Conn.

[21] Appl. No.: 525,113

[22] Filed: Sep. 8, 1995

[51] Int. Cl.⁶ .................................................. F02K 1/38
[52] U.S. Cl. ...................... 60/262; 239/265.11; 181/220
[58] Field of Search .......................... 60/262, 263, 264; 181/213, 220; 239/265.11, 423

[56] References Cited

U.S. PATENT DOCUMENTS

| | | | |
|---|---|---|---|
| 3,002,341 | 10/1961 | Muzzy et al. | 239/419 |
| 3,027,710 | 4/1962 | Maytner | 60/35.6 |
| 3,048,376 | 8/1962 | Howald et al. | 60/262 |
| 3,377,804 | 4/1968 | Wright et al. | 60/262 |
| 3,514,955 | 6/1970 | Paulson et al. | 60/262 |
| 3,673,802 | 7/1972 | Krebs et al. | 60/226 |
| 3,710,890 | 1/1973 | True et al. | 181/33 |
| 4,045,957 | 9/1977 | DiSabato | 60/262 |
| 4,077,206 | 3/1978 | Ayyagari | 60/262 |
| 4,117,671 | 10/1978 | Neal et al. | 60/262 |
| 4,226,085 | 10/1980 | Johnson | 60/262 |
| 4,302,934 | 12/1981 | Wynosky et al. | 60/262 |
| 4,335,801 | 6/1982 | Stachowiak et al. | 181/220 |
| 4,401,269 | 8/1983 | Eiler | 60/262 |
| 4,487,017 | 12/1984 | Rodgers | 60/262 |
| 4,501,393 | 2/1985 | Klees et al. | 239/265.13 |
| 4,576,002 | 3/1986 | Mavrocostas | 60/264 |
| 4,592,201 | 6/1986 | Dusa et al. | 60/262 |
| 4,754,924 | 7/1988 | Shannon | 181/220 |
| 4,813,230 | 3/1989 | Braithwaite | 60/262 |
| 4,835,961 | 6/1989 | Prez, Jr. et al. | 60/262 |
| 4,909,346 | 3/1990 | Torkelson | 181/213 |
| 5,060,471 | 10/1991 | Torkelson | 60/262 |
| 5,157,916 | 10/1992 | Wynosky et al. | 60/204 |
| 5,167,118 | 12/1992 | Torkelson | 60/226.1 |
| 5,235,813 | 8/1993 | McVey et al. | 60/737 |
| 5,265,408 | 11/1993 | Shoeran et al. | 60/262 |
| 5,315,815 | 5/1994 | McVey et al. | 60/39.06 |
| 5,440,875 | 8/1995 | Torkelson et al. | 60/226.1 |

OTHER PUBLICATIONS

Greatrex, F.B. "Reduction of Jet Noise", Flight, V. 68, No. 2424, pp. 57–60 Jul. 8, 1955.

Primary Examiner—Timothy Thorpe
Assistant Examiner—Ted Kim
Attorney, Agent, or Firm—Matthew J. Patterson

[57] ABSTRACT

A lobed mixer has major and minor lobes. The major lobes increase in both height and width in the downstream axial direction. Each major lobe has two minor lobes positioned on its radially outer surface located downstream of the beginning of the major lobe. The radial depth of the minor lobes increases with downstream axial distance but is never greater than the depth of the major lobes. Each of the chutes formed between the minor lobes introduces an additional stream of cold, low velocity fan flow into the hot, high velocity core flow to improve the uniformity of mixing. The double lobed mixer decreases acoustic intensity while having little or no effect on engine performance.

3 Claims, 2 Drawing Sheets

DOUBLE LOBED MIXER WITH MAJOR AND MINOR LOBES

TECHNICAL FIELD

This invention relates generally to gas turbine engine noise suppression systems and more specifically to improved lobed exhaust mixers therefor.

BACKGROUND ART

Noise generated by jet aircraft engines during takeoff and landing is a serious environmental problem and a matter of public concern in most parts of the world. Jet aircraft engines emit great quantities of high velocity gases at their exit nozzles and it is, in large measure, the shearing forces between the high velocity gases and the ambient air that produce a significant component of the high levels of noise that many find objectionable. Because of the adverse impact noise has on the environment, many countries have imposed increasingly strict noise reduction criteria on aircraft. In the United States, the Federal Aviation Administration has imposed strict noise reduction requirements which will place strong operating restrictions on aircraft that are currently in use. These restrictions range from financial penalties and schedule restrictions to an outright ban on the use of the aircraft. An effective and efficient noise reduction solution is necessary since these restrictions would severely cut short the useful life for certain types of aircraft that commercial airlines are currently using. For background information related to noise reduction systems for jet engines, reference may be made to the following U.S. Pat. Nos.: 3,710,890; 4,077,206; 4,117,671; 4,302,934; 4,401,269; 4,501,393; 4,909,346; 5,060,471; 5,167,118; and 5,440,875.

Sound is caused by pressure waves in the air, set in motion by a source. The level of pressure generated determines the intensity of the sound and can be measured by instrumentation. The annoyance of sound to a listener is determined by the intensity of the sound and the duration of that sound experienced by the listener. In the turbofan engine industry, the effect of noise on humans is expressed in terms of an effective perceived noise intensity level, EPNdB, based on the bel unit system for noise intensity.

Generally speaking, the jet noise generated by turbofan engines is normally dominated by two sources: the fan or bypass flow and the primary flow. These two sources are concentric components that flow in axial streams out of the engine's exhaust nozzle, to produce useful thrust.

Turbofan engines are categorized as either high bypass ratio or low bypass ratio based on the ratio of bypass flow to core flow. As air enters the front of the jet engine it passes through the fan and is split between the primary flow and bypass flow. The primary flow first enters the low pressure compressor then the high pressure compressor. The air is then mixed with fuel and the mixture is burned thereby increasing its pressure and temperature and is passed into the high pressure turbine and low pressure turbine where the energy is converted to work to turn the fan and compressor and to useful thrust in the form of exhaust. The bypass flow is created by the fan and passes outside the core of the engine through a duct and is exhausted as useful thrust. Generally, turbofan engines having a bypass ratio of two or less are categorized as low bypass ratio engines. In low bypass ratio engines the core flow and the bypass flow enter the exhaust at the nearly the same pressure but not at the same velocity or temperature. It is a characteristic of a turbofan engine that noise increases with increased relative difference in velocity between fan and core flows and that velocity is proportional to temperature. In a typical turbofan engine with a bypass ratio approximately equal to two, at a given power setting, the flow temperature and velocity in the primary duct are typically on the order of 940° F. and 861 ft/s respectively, and the fan duct flow temperature and velocity for the same power setting are 220° F. and 442 ft/s. Noise from the jet exhaust of the core flow is generated in regions behind the engine by the turbulent mixing of the core and fan exhaust streams and also where the high velocity jet exhaust mixes with the ambient air.

Experience in the turbofan industry has proven that the mixing of the two air flows before they exit the exhaust nozzle is beneficial in reducing perceived noise levels. As defined by the bypass ratio, there is a larger volume of low velocity, low temperature fan flow than the high velocity, high temperature primary flow and mixing the two flows serves to lower the overall exhaust velocity of the mixed air and therefore, lowers the overall perceived noise level. In a typical low bypass ratio turbofan engine, unless they are mixed, the two flows will remain substantially distinct as they exit the exhaust nozzle of the engine and the perceived noise level will remain high. In general, a more homogeneous mixed flow, prior to exiting the engine's exhaust nozzle, will result in a lower overall temperature and velocity of the mixed the flow, which in turn results in a lower perceived noise level.

The object of forced mixing within the engine is to lower the overall velocity of the flow before combining with the ambient air to decrease the noise produced by the exhaust jet mixing with the ambient air. Many schemes have been employed in an attempt to optimize forced mixing through a trial and error evolution that has resulted in various geometries, one in particular being the lobed mixer. Most commercial applications of lobed mixers achieve typical noise reductions in the range of 3.5 to 4.5 EPNdB. Since the early 1960's forced mixing, as described in U.S. Pat. No. 3,027,710, has been used to reduce the noise produced by low bypass ratio turbofan jet engines. Such forced mixing for noise reduction purposes is commonly accomplished through the use of a lobed mixer attached to the engine near the turbine exit, immediately upstream from the exhaust nozzle. The lobed mixer typically has a number of circumferentially spaced lobes of increasing radial height in the axial downstream direction, arranged in a fashion whereby chutes are formed between the lobes. The fan air is directed through chutes between the lobes on the outer surface of the mixer and the primary core flows through chutes defined by the lobes on the inside surface of the mixer. The chutes and lobes operate to mix hot, high velocity core flow with a larger volume of cooler, low velocity fan air. Due to less than complete mixing in prior art lobed mixers such mixers produce a number of discrete segments of mixed air downstream of the mixer. The number of segments produced is equal to the number of lobes on the mixer and the segments are essentially similar in temperature profile. However, one problem with such lobed mixers is that the temperature varies in the radial direction within each downstream segment such that local hot spots are defined near the center of each lobe location. These local hot spots are made up of hot, high velocity gases and are caused by incomplete mixing of the two streams within the exhaust duct. With prior art lobed mixers, it is virtually impossible to eliminate such hot spots without reducing the effectiveness of the lobed mixer as a sound suppression device.

Forced mixing has also been used for other purposes such as in U.S. Pat. No. 3,048,376, Howald et al. In the Howald patent the mixer is used to achieve a mix of the fan flow and core flow before the gas enters an afterburner to realize a more efficient combustion in the afterburner itself. This type of application differs greatly from the use of a mixer in commercial aircraft for noise reduction purposes. First, the Howald et al mixer is positioned just in front of the afterburner inside the engine duct, a substantial distance upstream of the exhaust nozzle, and is an integral part of the combustion process. Second, afterburners are typically used on military aircraft where noise levels are not a primary concern. Third, the Howald et al mixer has secondary lobes running the full length of the mixer accounting for a large increase in surface area, resulting in pressure losses which may be unacceptably high from a commercial perspective. Lastly, since the mixer is upstream of the afterburner, the mixed gas is subsequently infused with fuel and ignited in the afterburner, further accelerating the gas which generates a tremendous level of noise when it finally exits the exhaust nozzle of the engine, because the gas is much hotter and flowing at a much higher velocity than in an engine without an afterburner, thereby obviating the mixer as a noise reduction device.

The practice of forced mixing for noise reduction purposes does not come without cost. Frequently, increased mixing for noise reduction purposes comes at the expense of increased flow losses which result in performance losses and reduced fuel efficiencies for the same power level settings. For example, in a commercial aircraft, a one percent loss in performance could result in a decrease of over twenty five nautical miles in maximum range and an increase of one half of a percent in operating costs.

The objective in a lobed mixer is to achieve the highest level of uniform mixing of the two flows prior to exiting the exhaust nozzle. A common concept within the industry is that the more lobes a mixer has, the better the uniformity of the mixed gas and the greater the reduction in perceived noise. This concept attempts to produce a uniform mix circumferentially about the engine centerline at the exit plane of the exhaust nozzle. However, when the number of lobes is increased, so too is the surface area over which the gas must flow prior to exiting the exhaust nozzle. When the area is increased the pressure losses due to drag across these surfaces increase. The converse is also true. The fewer lobes a mixer design has, the lower pressure losses, the lower the uniformity of mixing, and the lower the effectiveness in sound suppression. Heretofore the process of designing an effective lobed mixer has been to optimize the number of lobes to achieve a satisfactory trade-off between sound suppression and pressure losses.

DISCLOSURE OF INVENTION

In general, the present invention is a double lobed mixer which substantially reduces noise levels of a turbofan engine without appreciably sacrificing engine efficiencies. Major lobes of the mixer of the present invention function similarly to those found on a conventional lobed mixer wherein the lobes define primary chutes between pairs of major lobes. The chutes act as gas conduits whereby cool, low velocity fan air is driven into the chutes and directed into the hot high velocity core air flow to produce uniform circumferentially spaced segments of mixed air. As is typical in conventional lobed mixers, the segments that are produced would have temperature gradients in the radial direction. The minor lobes of the present invention are positioned within each major lobe, forming minor chutes which channel cool fan air to the hottest region of each segment of mixed air. As a result, the mixed air flow exits the exhaust nozzle at a greater level of mixing and with a substantially lower overall velocity and associated noise producing potential.

The double lobed mixer of the present invention is attached to the apt portion of a turbofan engine after the last low turbine stage by any conventional means. The major lobes increase in depth in an axially downstream direction distributed around the circumference of the mixer. Each pair of minor lobes define the radially outward surface of the major lobes. The minor lobes begin aft of the upstream end of the major lobes, having a length and depth which increase in an axially downstream direction. The surface area of the minor lobes is less than the surface area of the major lobes because the length and depth of the minor lobes are less than that of the major lobes and, therefore, the pressure losses associated with the minor lobes is less than the major lobes. The height and geometry of these minor lobes are such that cold low velocity fan flow is delivered at discreet locations within the hot high velocity core flow stream. The net effect of the invention is to improve the mixing of the air by lowering its peak temperature and velocity noise prior to the exit of the exhaust nozzle.

BEST MODE FOR CARRYING OUT THE INVENTION

Figure 1:
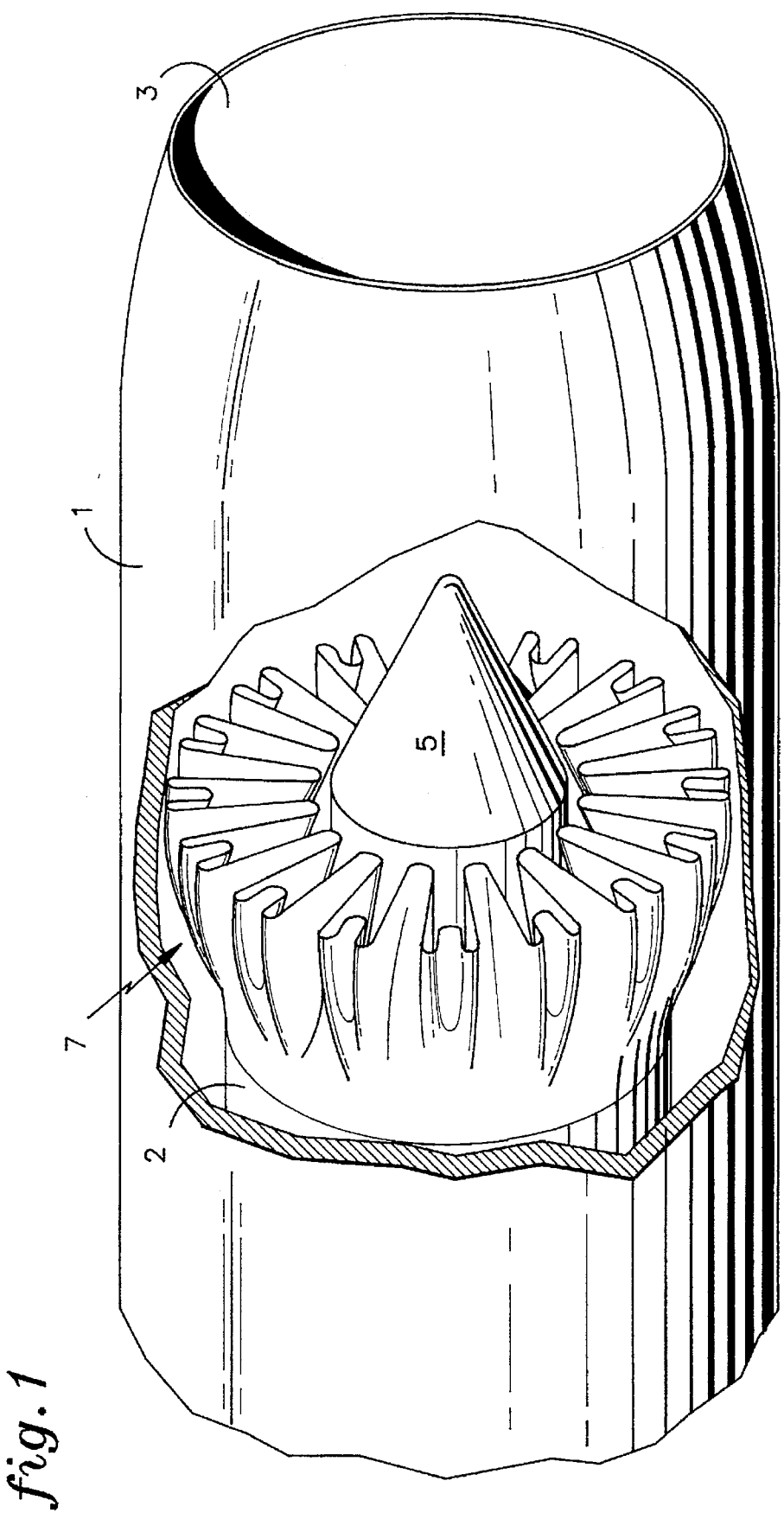
FIG. 1 is a view of the aft end of a turbofan engine partly broken away, and showing a perspective view of the double lobed mixer of the present invention.

FIG. 1 illustrates the aft end of a turbofan engine having a nacelle 1. A portion of the nacelle 1 is cutaway in FIG. 1 to expose a turbine 2 and exhaust nozzle 3 in accordance with the present invention. In a typical turbofan engine air enters the upstream end of the engine. As is well known in the art and, therefore, not illustrated herein, as air enters the front of the jet engine it passes through the fan and is split between the primary flow and bypass flow. The primary flow first enters the low pressure compressor then the high pressure compressor. The air is then mixed with fuel and the mixture is burned thereby increasing its pressure and temperature and is passed into the high pressure turbine and low pressure turbine where the energy is converted to work to turn the fan and compressor and to useful thrust in the form of exhaust. The bypass flow is created by the fan and passes outside the core of the engine through a duct and is exhausted as useful thrust. The two flows form separate concentric streams that rejoin at the turbine exhaust area of the engine. The two flows are mixed as described herein below and discharged at the exhaust 3.

Figure 2:
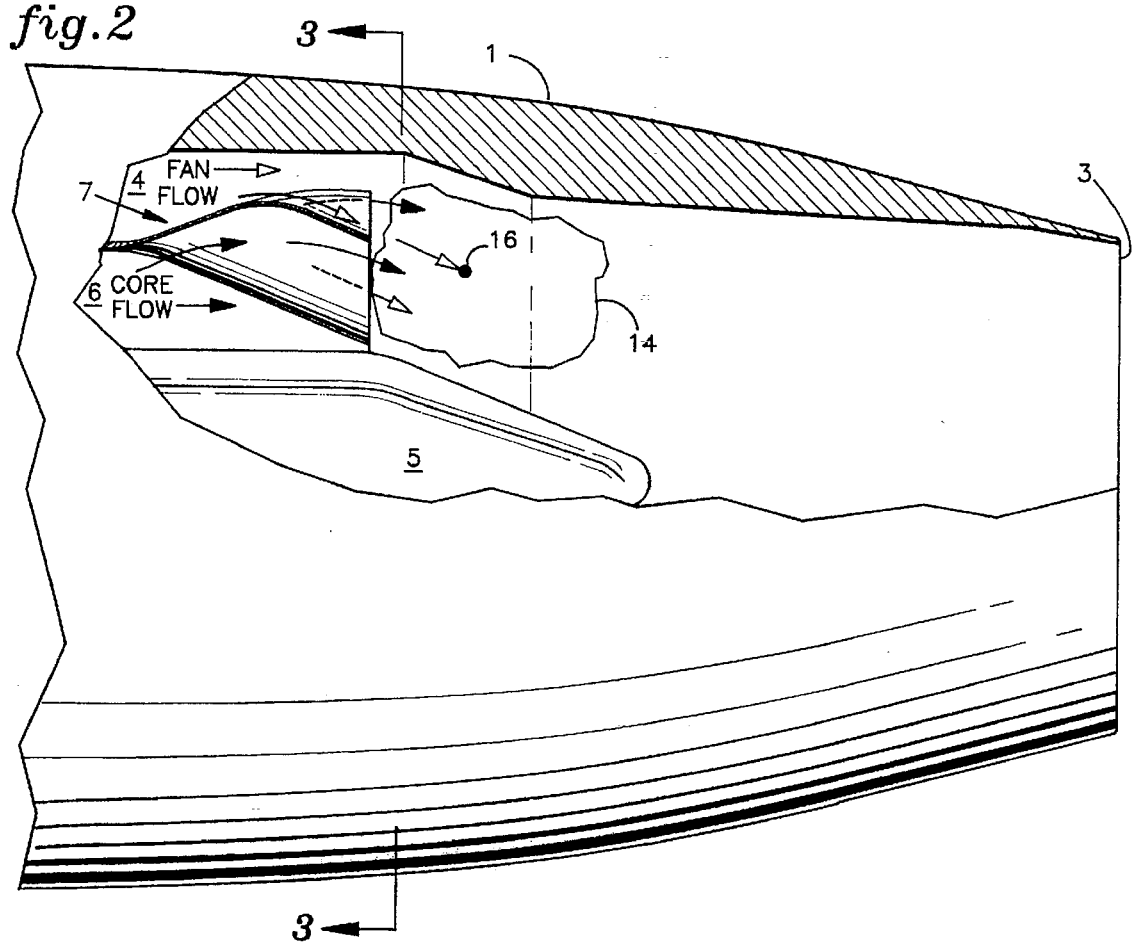
FIG. 2 is an elevation of the aft end of a turbofan engine partly broken away and partly in section, showing a portion of the double lobed mixer of the present invention.

FIG. 2 shows a cross section of the present invention through a cutaway of the nacelle 1 as viewed in the plane of the central axis of the engine. The inner surface of the nacelle 1 defines the boundary of the fan flow 4 and a plug 5 is shown defining the boundary of the core flow 6.

Figure 3:
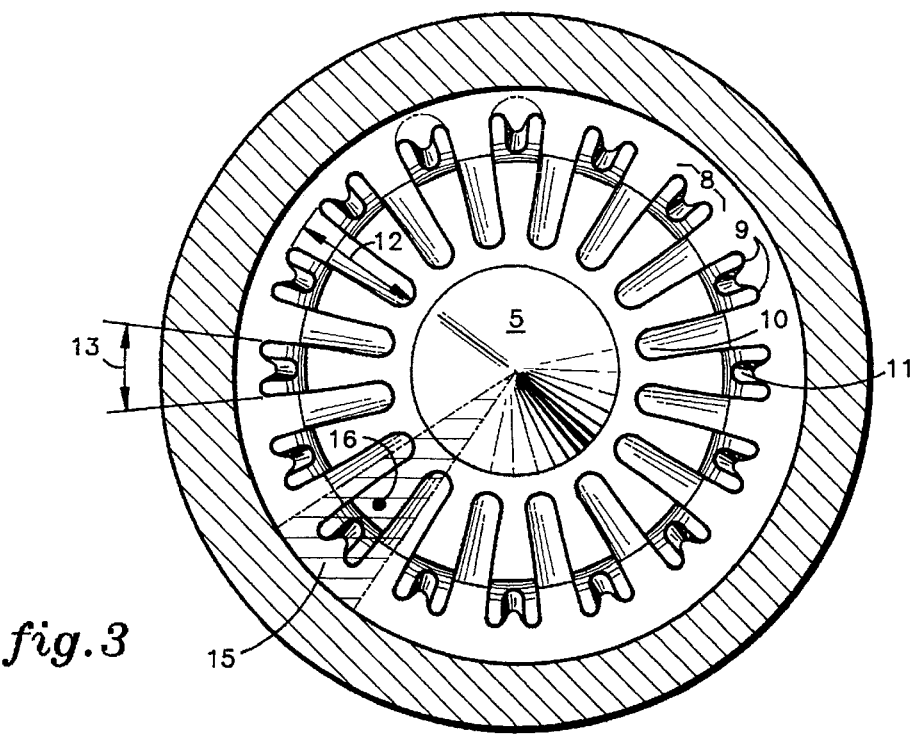
FIG. 3 is a cross sectional view taken substantially along the line 3—3 of FIG. 2 showing the double lobed mixer of the present invention.

The velocity of the gas in the fan flow 4 is much lower than the core flow 6 exiting the turbine. As set forth hereinabove, the turbulent mixing of these two streams behind the engine, as well as the mixing of the high velocity air with ambient air behind the engine, produces a large component of the noise emitted from turbofan engines. Effective mixing of the two streams prior to their exiting of the engine works to lower the overall velocity of the gases before exiting the exhaust nozzle of the turbofan engine and is effective in reducing the noise emitted by the engine. The mixing of the two flow streams is effected by a double lobed mixer 7 which directs a portion of the fan flow 4 inwardly and a portion of the core flow 6 outwardly. The double lobed mixer 7 shown in FIG. 3 is a hollow duct having a circumferentially sinuous shaped body defining major lobes 8 and minor lobes 9 and major chutes 10 and minor chutes 11. A pair of minor lobes 9 is positioned on the radial outward portion of each of the major lobes 8. A minor chute 11 is formed between each of the minor lobes 9. Both major and minor chutes act as conduits to direct fan flow 4 inwardly and the radially inner surfaces of the lobes act as conduits to direct core flow 6 outwardly to force the two flows to mix prior to exiting the exhaust nozzle 3. The double lobed mixer 1 shown in the drawings has sixteen major lobes 8.

The double lobed mixer 7 is shaped to prevent separation and associated pressure losses. The major lobe height 12 and major lobe width 13 both increase in the axially downstream aft direction. The increasing lobe width 13 has the effect of accelerating the fan flow 4 through the major chute 10 thereby minimizing pressure losses.

The two flow streams mix together in the mixing region 14 and form mixed segments 15 of relative circumferential uniform velocity, equal in number to the number of major lobes 8 of the mixer. Mixers of prior art having lobes as illustrated in phantom in FIG. 3 exhibit incomplete mixing in the radial direction of each mixed segment 15 and give rise to localized unmixed regions of core flow, or hot spots 16, that remain near the center of each mixed segment 15. The hot spots 16 generally occur near the radially outward portion of the major lobes and therefore the addition of more major lobes, within practical limits, would function only to make the hot spots smaller and more numerous, but would not eliminate them. The flow associated with these hot spots exits the engine at the unmixed velocity of the core flow and therefore produces a large amount of noise.

In the arrangement of the present invention, the radial and circumferential location of the hot spots 16 are analytically predicted and each minor chutes 11 is located between two minor lobes 9 to direct a jet of fan flow at the location where a hot spot would otherwise exist. Because the location of the would be hot spots is generally radially outward within each mixed segment 15 the minor lobes 9 and the minor chutes 11 formed therebetween never approach the height and width of the major lobes 8 and the major chutes 10. The deliberate direction of additional fan flow 4 into the would-be hot spot 16 eliminates this othewise unmixed region and produces mixed segments of circumferential and radial uniform velocity prior to the gases exiting the engine. The result of the increased uniformity of mixing of the two flows is a significant reduction in the noise emitted by the engine. In addition, the added surface area of the minor lobes 9 and the minor chutes 10 is much less than that which would result from adding major lobes 8 and major chutes 10 and, therefore, minimizes additional pressure losses. The benefit of improved mixing without significant pressure loss makes the double lobed mixer a commercially viable sound suppression device.

In operation, the major lobes 8 and major chutes 10 segment the inner and outer flow streams into interleaved inner and outer segments, the segmentation and interleaving beginning at a common location along the engine axis. The minor lobes 9 and minor chutes 11 divert an additional portion of the outer stream radially inwardly beginning at an axial location downstream of the common location and at a circumferential location intermediate the circumferential extremities of the inner segments. The inner and outer segments and the additional portions are combined into a common stream in the mixing region 14 so that the additional portions are introduced into discrete radial locations in the common stream.

While we have described particular embodiments of the current invention for purposes of illustration, it is well understood that other embodiments and modifications are possible within the spirit of the invention. Accordingly, the invention is not to be limited except by the scope of the appended claims.

What is claimed is:

1. A mixer for mixing concentric inner and outer flow streams in a turbofan engine, the mixer having a plurality of circumferentially distributed axially extending major lobes, each major lobe having a radial height which increases in the downstream direction, the major lobes defining a plurality of circumferentially distributed major chutes, the mixer characterized by:

a pair of minor lobes at the radially outermost periphery of each major lobe;

each minor lobe having a radial depth which is smaller than the radial depth of the major lobes;

each minor lobe originating aft of the upstream ends of the major lobes; and each pair of minor lobes defining a minor chute for directing a portion of the outer flow stream to discrete radial locations in the inner flow stream.

2. The mixer of claim 1 characterized in that the maximum radial depth of the minor lobes is no more than one half the maximum radial depth of the major lobes.

3. The mixer of claim 1 characterized in that the number of major lobes is between ten and twenty.

* * * * *